(12) United States Patent
Roach et al.

(10) Patent No.: US 7,159,048 B2
(45) Date of Patent: Jan. 2, 2007

(54) DIRECT MEMORY ACCESS (DMA) TRANSFER BUFFER PROCESSOR

(75) Inventors: Bradley Roach, Newport Beach, CA (US); David Duckman, Long Beach, CA (US); Eric Peel, Mission Viejo, CA (US); Qing Xue, Irvine, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 142 days.

(21) Appl. No.: 10/179,816

(22) Filed: Jun. 24, 2002

(65) Prior Publication Data

US 2003/0110325 A1   Jun. 12, 2003

Related U.S. Application Data

(60) Provisional application No. 60/339,187, filed on Dec. 10, 2001.

(51) Int. Cl.
G06F 13/28 (2006.01)
(52) U.S. Cl. .......................................... 710/22; 710/28
(58) Field of Classification Search ............ 710/22–24, 710/28; 709/220
See application file for complete search history.

(56) References Cited

U.S. PATENT DOCUMENTS 5,392,406 A    2/1995  Petersen et al.
5,634,099 A    5/1997  Andrews et al. ............ 709/212
5,689,509 A   11/1997  Gaytan et al. .............. 370/396
5,740,467 A    4/1998  Chmielecki, Jr. et al. ..... 710/56
6,131,144 A   10/2000  Koppala ..................... 711/132
6,199,124 B1 * 3/2001  Ramakrishnan et al. ...... 710/40
6,202,107 B1   3/2001  Collier ........................ 710/22
6,212,593 B1   4/2001  Pham et al. ................ 710/266
6,272,564 B1   8/2001  Garrett et al. ................ 710/33
6,674,751 B1 * 1/2004  Dittmar ...................... 370/364

* cited by examiner

Primary Examiner—Fritz Fleming
Assistant Examiner—Harold Kim
(74) Attorney, Agent, or Firm—Morrison & Foerster LLP

(57) ABSTRACT

A DMA (Direct Memory Access) Exchange Block (DXB) processor may include a receive processor for writing data from a local memory to a host memory over a bus, e.g., a Peripheral Component Interconnect Extended (PCI/X) bus, and a transmit processor for writing data retrieved from the host memory over the bus to the local memory. Each processor may include a high priority queue and a normal priority queue. A controlling program generates DXBs, each of which include a tag assigned by the controlling program and memory descriptors corresponding to a direct memory access operation. The memory descriptor may include a host memory descriptor (address/length) and one or more local memory descriptors. The controlling program writes a DXB to one of the queues in a cache line spill operation. The transfer processor may include two channel registers, enabling the processor to perform two PCI/X data transfers simultaneously.

22 Claims, 12 Drawing Sheets

DIRECT MEMORY ACCESS (DMA) TRANSFER BUFFER PROCESSOR

CROSS-REFERENCE TO RELATED APPLICATION

This application claims priority to U.S. Provisional Application Ser. No. 60/339,187, filed on Dec. 10, 2001.

BACKGROUND

Direct Memory Access (DMA) is a technique for transferring data between system memory and a device without the aid of a CPU (Central Processing Unit). Instead, a specialized processor, typically referred to as a DMA controller, may handle these transfers.

A DMA operation may require multiple transfers over the bus, depending on the size of the data block to be accessed and the amount of data that may be sent over the bus per transfer. In order to set up a DMA operation, the DMA controller may obtain the physical addresses to be used for data transfers and map them into device registers. After the DMA operation is performed, the DMA controller may post-process the individual transfers. These pre-processing and post-processing operations may introduce latency into the DMA operation and significantly reduce the efficiency of the operation for all data transfers.

SUMMARY

A DMA (Direct Memory Access) Exchange Block (DXB) processor may include a receive processor for writing data from a local memory to a host memory over a bus, e.g., a Peripheral Component Interconnect Extended (PCI/X) bus, and a transmit processor for writing data retrieved from the host memory over the bus to the local memory. Each processor may include a high priority queue and a normal priority queue. A controlling program generates DXBs, each of which include a tag assigned by the controlling program and memory descriptors corresponding to a direct memory access operation. The memory descriptor may include a host memory descriptor (address/length) and one or more local memory descriptors. The controlling program writes a DXB to one of the queues in a cache line spill operation. The transfer processor may include two channel registers, enabling the processor to perform two PCI/X data transfers simultaneously.

DETAILED DESCRIPTION

Figure 1:
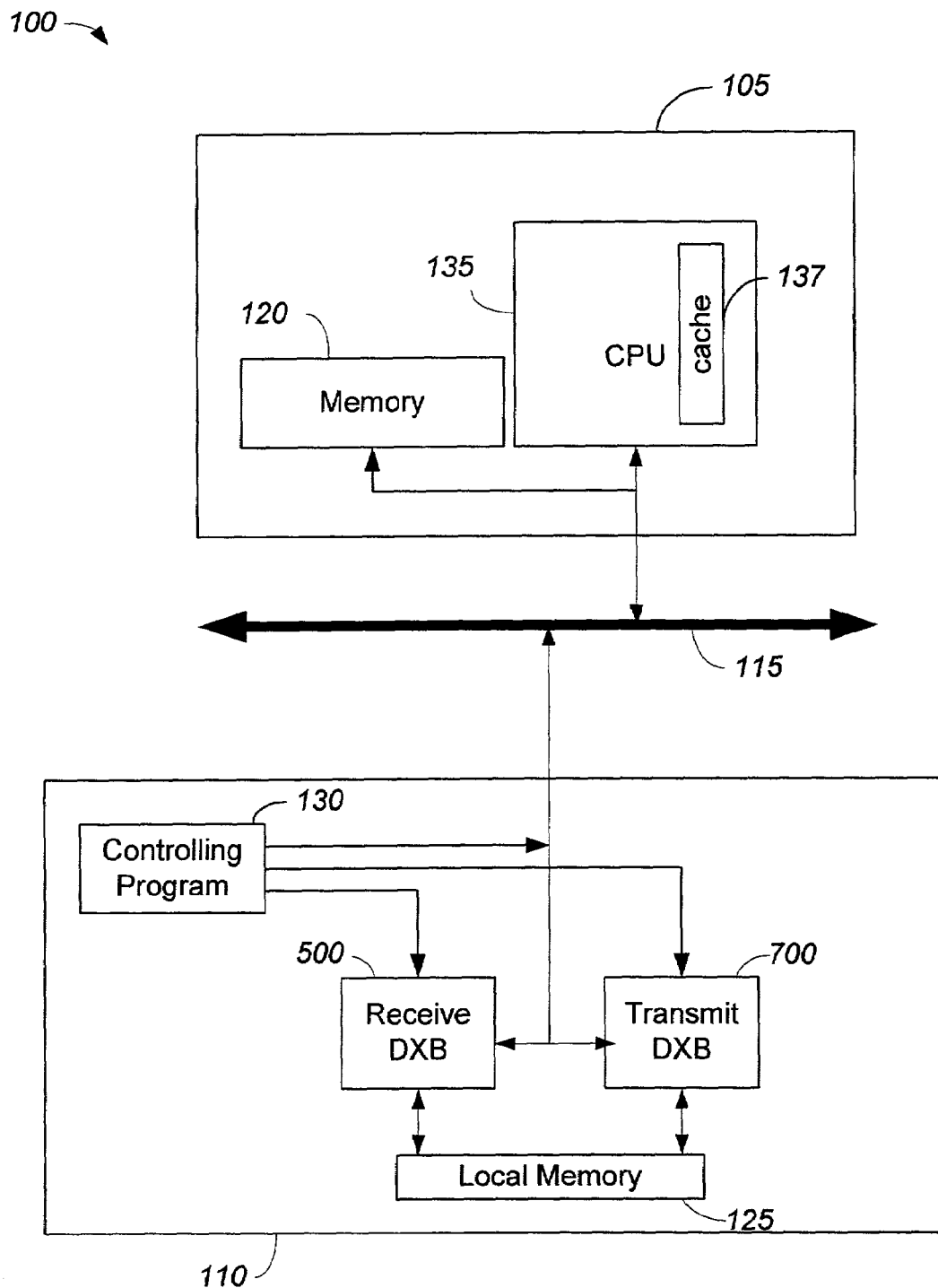
FIG. 1 is a block diagram of a system according to an embodiment.

FIG. 1 illustrates a system 100 including a host 105 and a device 110 which communicate over a bus 115. The bus may use, for example, a PCI (Peripheral Component Interconnect) or a PCI/X (PCI Extended) bus interface. The device may include DMA (Direct Memory Access) Exchange Block (DXB) processors 500, 700 for controlling DMA operations between a system, or host, memory 120 and a device local memory 125. The receive DXB processor 500 may be used to read data from local memory 125 and transfer the data to the host memory 120 via the bus 115. The transmit DXB processor 700 may be used to write data from the host memory 120 to the local memory 125.

The DXB processors may use a DXB to describe a single DMA operation. A controlling program 130 determines the proper address and length for a transfer and creates a single DXB image to define a transfer operation either for receiving data (writing host memory) or transmitting data (reading host memory). A controlling program 130 manages the set up, execution, and completion of each DXB. The controlling program may be firmware executed by a control processor 135.

The controlling program 130 may map one, two, or three local memory addresses to one host memory address, thereby increasing the amount of data that may be transferred across the bus in a DMA operation. The three local memory addresses may be spread across the local memory range. A DXB may describe a maximum DMA transfer size of, for example, 4 Kbytes.

The DXB may have a fixed size corresponding to the size of a cache line in the a CPU (Central Processing Unit) internal cache 137, e.g., 32 bytes for an exemplary CPU 135. This enables the controlling program 130 to set up a DMA operation using a cache line spill operation from the cache instead of setting independent registers in the device.

The DXB may include a unique DXB tag and a number of control flags. The controlling program 130 may specify the DXB tag, which it may use to identify the DMA operation during pre-processing, execution, and post-processing. The controlling program 130 may use these tags to support a number of DMA operations which are operated on based on priority.

Each of the receive DXB processor 500 and the transmit DXB processor 700 may include a high priority (HP) DXB queue 505, 705 and a normal priority (NP) DXB queue 510, 710. The queues may be circular queues. The high priority DXB queue 505 allows controlling program 130 to place critical DMA operations ahead of those in the NP DXB queue. The DXB processors may execute all DXBs on the HP DXB Queue before processing DXBs on the NP DXB Queue. A DXB may be written to one of the queues in a cache line spill operation and identified in the queue by its DXB tag.

Figure 2:
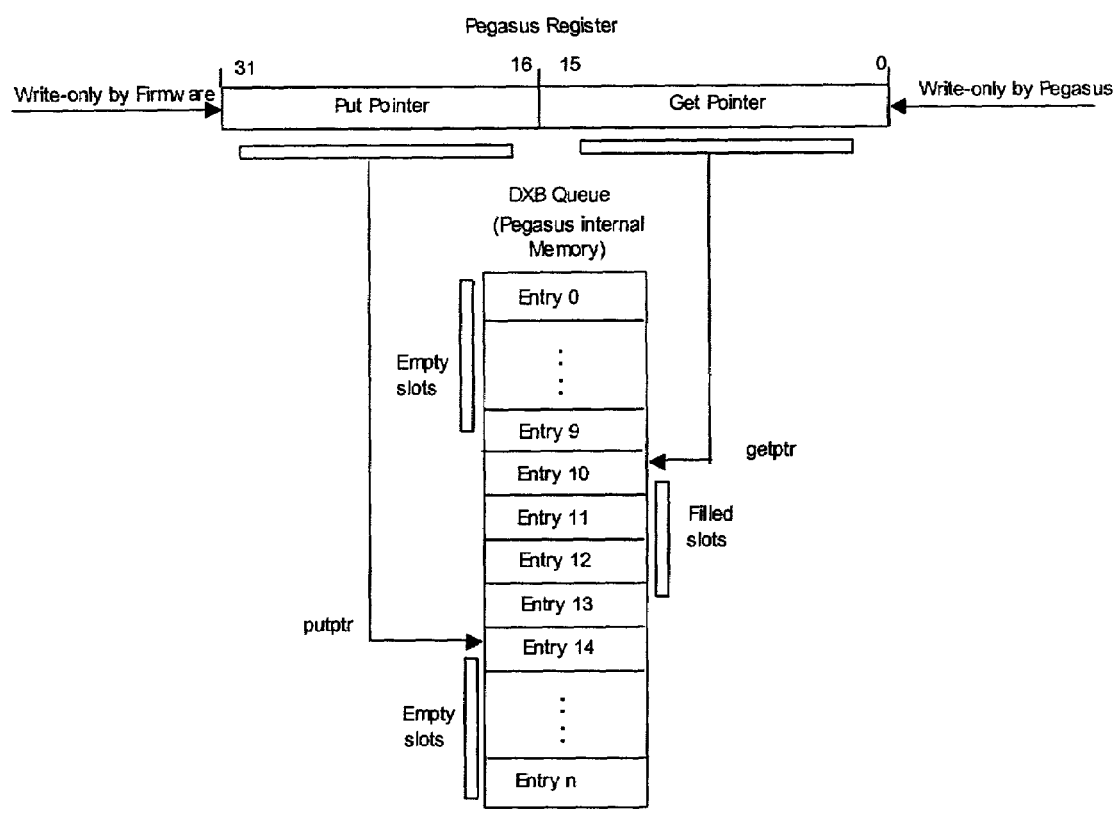
FIG. 2 is a block diagram of a Data Transfer Block (DXB) queue.

The DXB processors may manage their HP and NP DXB Queues using put pointers 205 and get pointers 210, as shown in FIG. 2. The put pointer 205 directs the controlling program 130 to the next available queue ring location where a DXB may be loaded. The put pointer 205 may be written and read by the controlling program 130 and read by the device 110. The get pointer 210 indicates the location of the current DXB being executed or the next DXB to be executed. The get pointer may be written and read by the device 110 and read by the controlling program 130. The put and get pointers may be post incremented. The controlling program 130 may increment the put pointer by any value providing that the controlling program does not overrun the get pointer value. The device increments the get pointer by one. The put and get pointers may reside in a single register.

In the case where the queue is full, the put pointer will be equal to the get pointer minus one. This situation indicates that there is one available queue entry, but this location cannot be used by the controlling program 130 until the device increments the get pointer 210. In the case where the queue is empty, the put pointer 205 will be equal to the get pointer 210. After the device is reset, the put and get pointers will be equal to zero.

Figure 3:
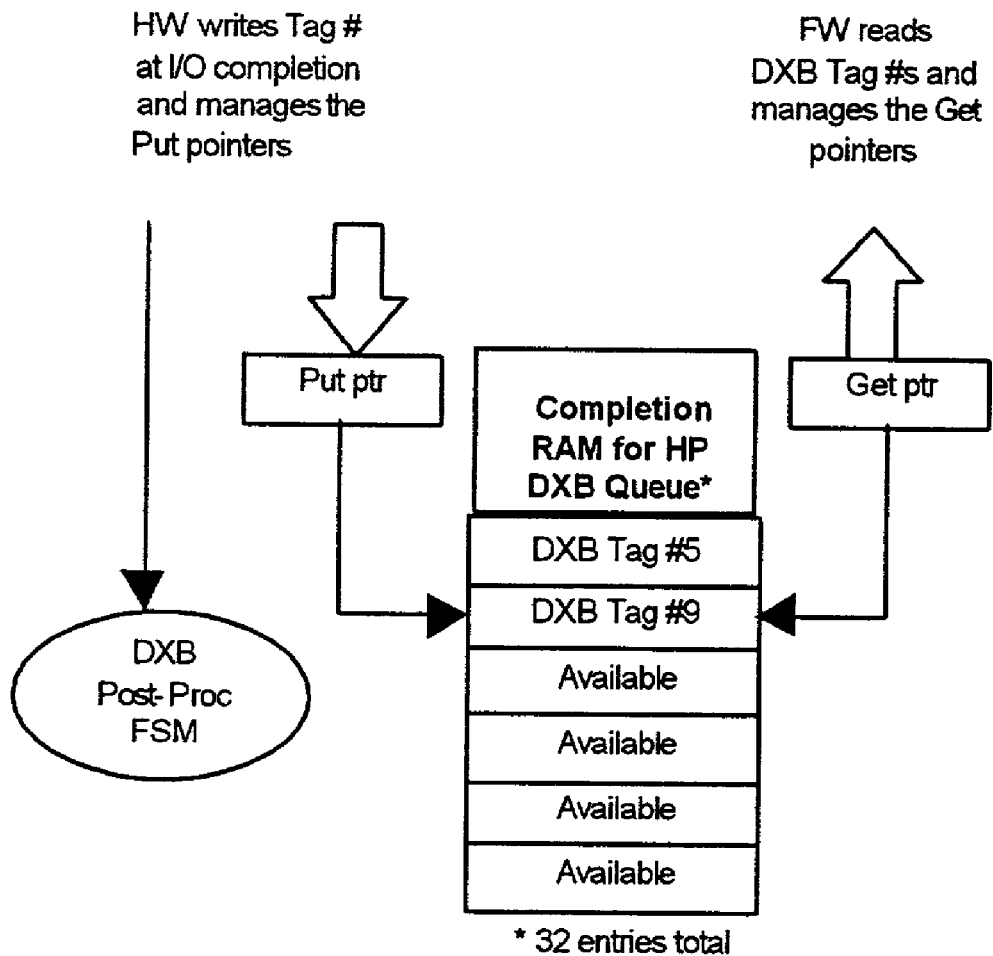
FIG. 3 is a block diagram of a DXB completion RAM (Random Access Memory).

The system may include two DXB processors: a receive DXB processor for receive operations and a transmit DXB processor for transmit operations. The DXB processors 500, 700 incorporate a write port into a Completion RAM (Random Access Memory) 300, shown in FIG. 3, to notify the controlling program 130 when DMA operations are complete, that is, when the destination buffer has received all the data, and indicate whether an error was encountered. The DXB stored in the Completion RAM may include error indicators which the controlling program 130 may use to determine why the DMA operation did not complete. Error completions may be posted at any time. The DXB Processor will post a normal completion only when the entire operation successfully completes. The controlling program 130 may only access the DXB processors through the HP and NP DXB queues 505, 510 and the Completion RAM 300.

The controlling program 130 has the capability to select whether an interrupt will be generated on each completion notification by setting a control flag in the DXB. This may eliminate unnecessary interrupt processing. However, if a DMA error occurs on a DXB operation where the interrupts have been disabled, the DXB processor will post a completion to the Completion Ram 300 which will indicate the I/O tag identification and the type of error encountered. For example, if a entire DMA operation requires four DXBs to be set-up by the controlling program 130, the controlling program can disable the interrupts on the first three DXBs and only enable the interrupt for the last DXB. In this scenario, the controlling program 130 will only need to process one interrupt at the completion of the entire DMA operation, unless an error occurs.

Figure 4A:
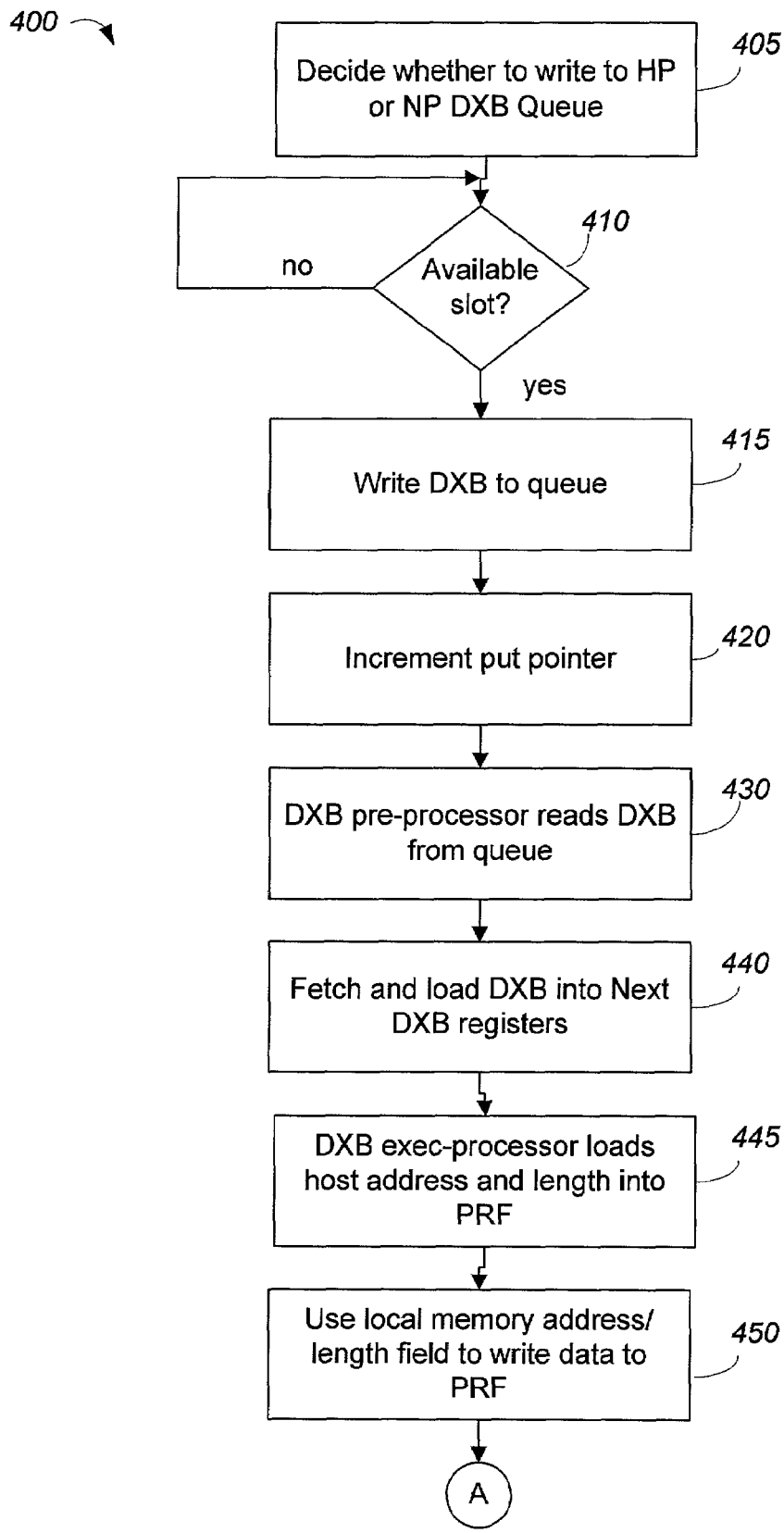
FIGS. 4A and 4B are flowcharts describing a DMA operation performed by a receive DXB processor.
Figure 4B:
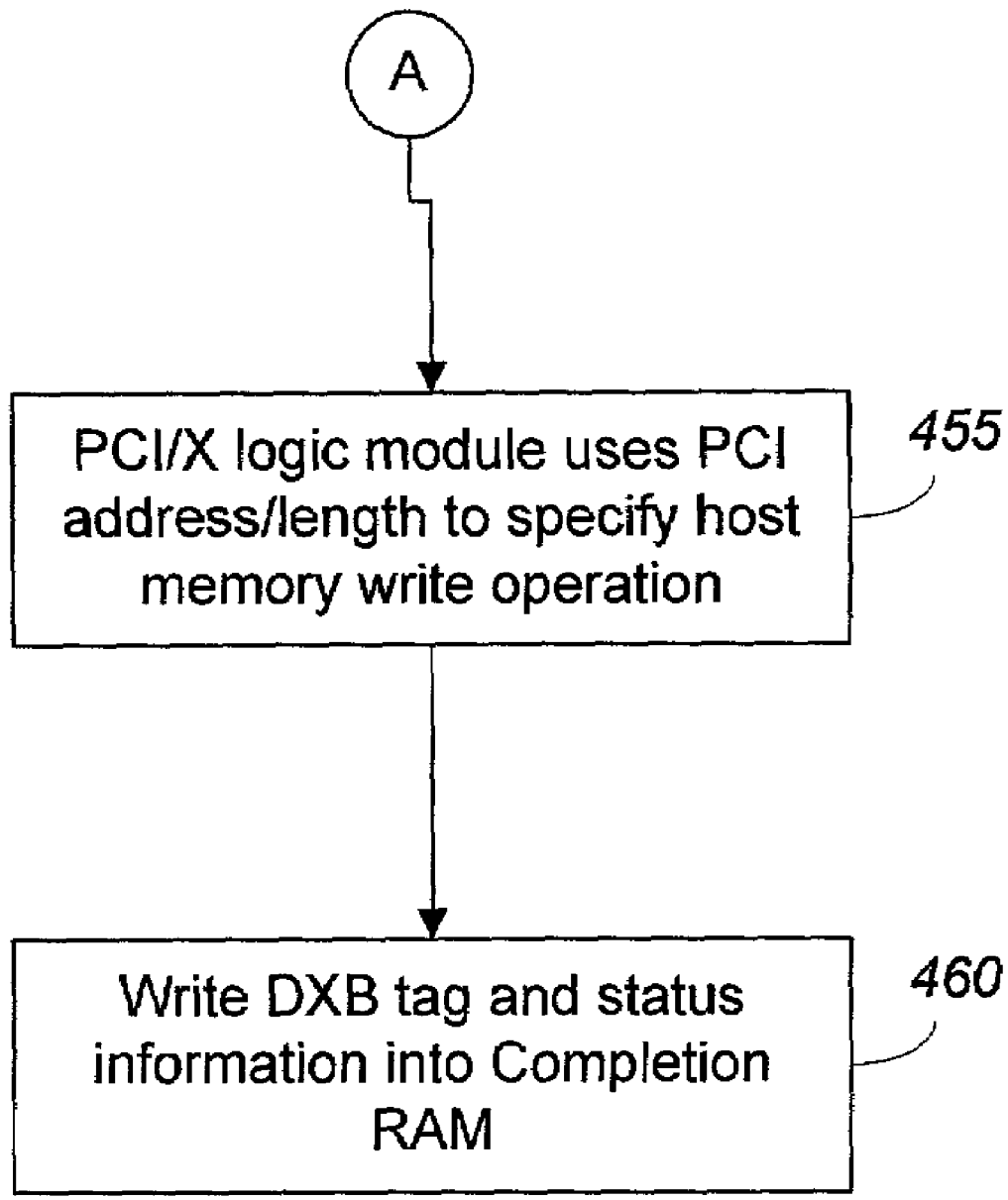
Figure 5:
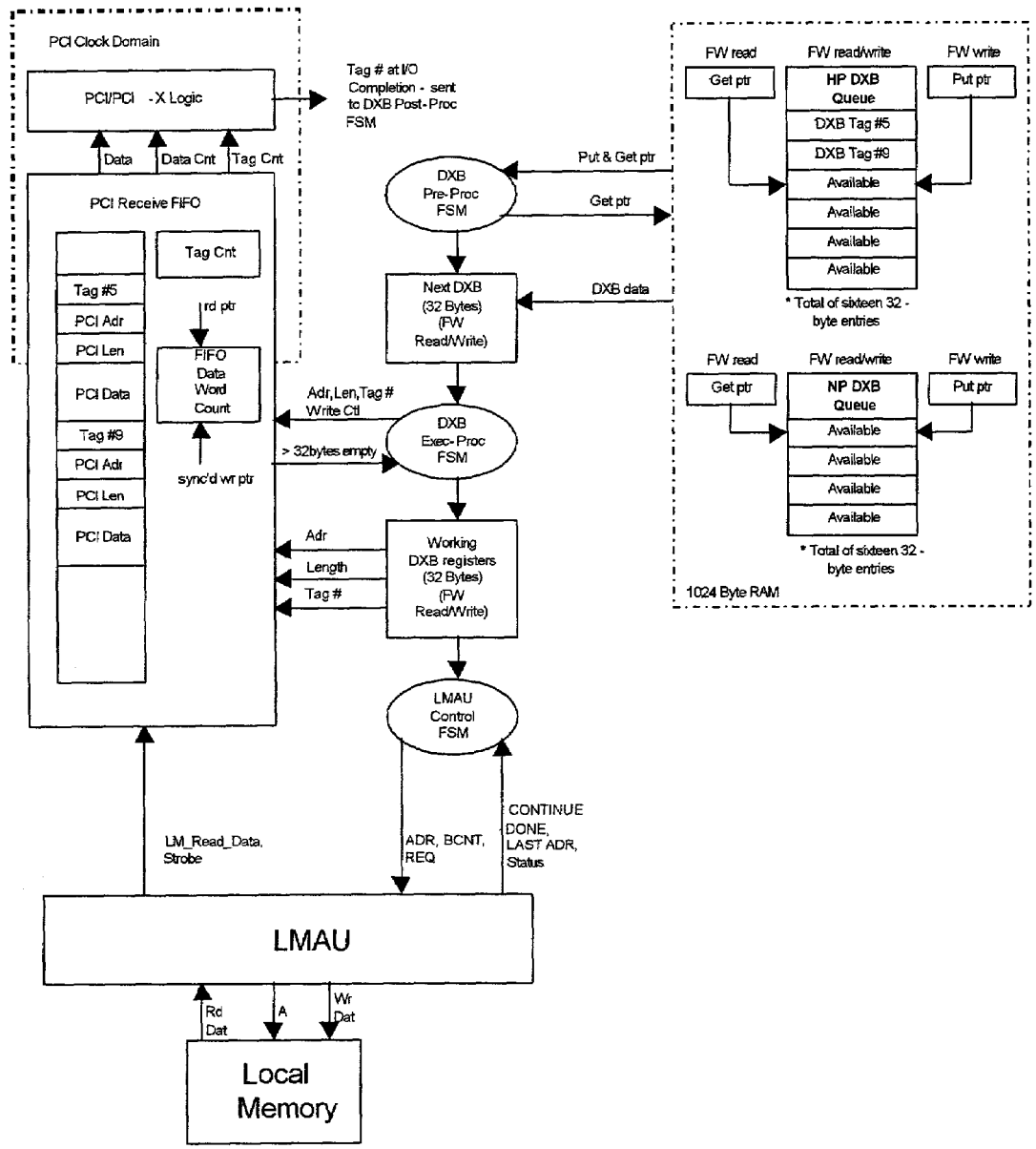
FIG. 5 is a block diagram of a receive DXB processor.

FIG. 4 is a flowchart describing a DMA operation 400 performed by the receive DXB processor 500, shown in FIG. 5. To start a DMA operation, the controlling program 130 must decide whether the DXB should be written to the HP DXB Queue or the NP DXB Queue (block 405). Next, the controlling program 130 reads the get and put pointers of the queue to determine whether there is an available slot (block 410). If the controlling program 130 determines that there is space available, then controlling program 130 writes the DXB into the queue, for example, by using a cache-line write operation (block 415). The controlling program 130 increments the put pointer to indicate the number of valid DXBs that were written into the queue (block 420).

The incremented put pointer indicates to a DXB pre-processor 515 that the queue is not empty. The DXB pre-processor checks the HP DXB Queue 505 first, and if that is the queue controlling program 130 used, the DXB is read from that queue (block 430). If not, the NP DXB Queue is checked for a DXB. The DXB pre-processor will start a 32-byte memory read operation to fetch a DXB from the appropriate queue and load the DXB into the Next DXB registers 520 (block 440). In this example, a DXB assigned DXB Tag #5 and a DXB assigned DXB Tag #9 are written into the HP DXB Queue and fetched by the DXB pre-processor. The controlling program 130 may also control the DXB Processor without using the queues by directly reading and writing the Next DXB registers. This may be desirable for very high priority events, such as error recovery operations. These registers may reside in a cacheable/bufferable address space so that a burst write can be performed.

A DXB exec-processor 525 loads the DXB tag and host address and length into PCI Receive FIFO (PRF) 530 (block 445). The DXB exec-processor may use working registers 527 to write the DXB tag and host address and length into the PRF 530. The working registers contain the most up to date information for the DMA operation. In the event of an error, the controlling program 130 may retrieve this information for a debugging operation.

The DXB exec-processor uses the local memory address/length fields (also called local memory descriptors) to begin reading data and writing the data into the PRF 530 (block 450). As data comes in, it is written into the PRF by LMAU (Local Memory Application Unit) 540. As described above, the DXB may include three local memory descriptors, in which case, the data for that DXB may be compiled from three different local memory locations.

The DXB Tag # along with status information may be returned to controlling program 130 through the Completion RAM 300 when the host memory write operation either completes or terminates with a fatal error.

The PRF 530 may use internal delimiter bits to delineate PCI address, length and DXB tag information from the actual data. The PRF may capture the number of DXB tags stored in the PRF to aid the data sizing logic.

A PCI/PCI-X logic module 550 uses the PCI address and length information to specify the host memory write operation (block 455). The PRF 530 passes a fill count to indicate how much data is present in the PRF for the current operation. If the tag count is equal to zero, then the PRF uses the read and write pointers to determine the fill count. If the tag count is not equal to zero, the PRF 530 uses the read pointer with the adjusted PCI length field to predict where the end of the data will be. When the operation is complete, the PCI/X module returns the DXB Tag # back to the DXB Processor. The DXB Post-Processor writes the DXB tag information along with PCI status into the Completion RAM (block 460).

The PRF 530 may inform the PCI/PCI-X logic module 550 when there is data available using two indicators. A Word Count field represents the total number of 64-bit data words in the PRF 530 that are ready to be written to host memory 120. The PCI address, length and DXB tag will not be counted as data bytes. The second indicator is the Tag Count. This count represents the number of complete PCI data packets that are currently in the PRF 530 (i.e., the number of DXB tags that the DXB Processor has written into the PRF).

The following pseudocode describes exemplary rules for using the Word Count and Tag Count fields:

If tag=0 and bank count<start threshold, Do not start the PCI DMA operation

If Tag Count=0 and Word Count<Start Threshold, do not start the PCI DMA operation If Tag Count>0, start the PCI DMA operation If Tag Count=0 and Word Count>Start Threshold, start the PCI DMA operation; then if Tag Count=0 and Word Count<Stop Threshold, stop the PCI DMA operation; else if Tag Count=1, continue the PCI DMA operation.

The PCI/PCI-X logic module 550 may use the Word Count with the PCI Address to make the determination when to assert the last ADB (Allowable Disconnect Boundary) sequence.

The Word Count may be placed in a PCI clock domain 560 to prevent data overrun and underrun scenarios. Since the FIFO read pointer operates in the PCI clock domain 560, the write pointer must be synchronized to the PCI clock domain. This clocking strategy will result in the number of of 64-bit words always lagging the actual write pointer due to synchronization delays. For the full FIFO case, the indicator for an empty bank will always lag the actual read pointer since the read pointer must be synchronized to the System clock domain.

Figure 6A:
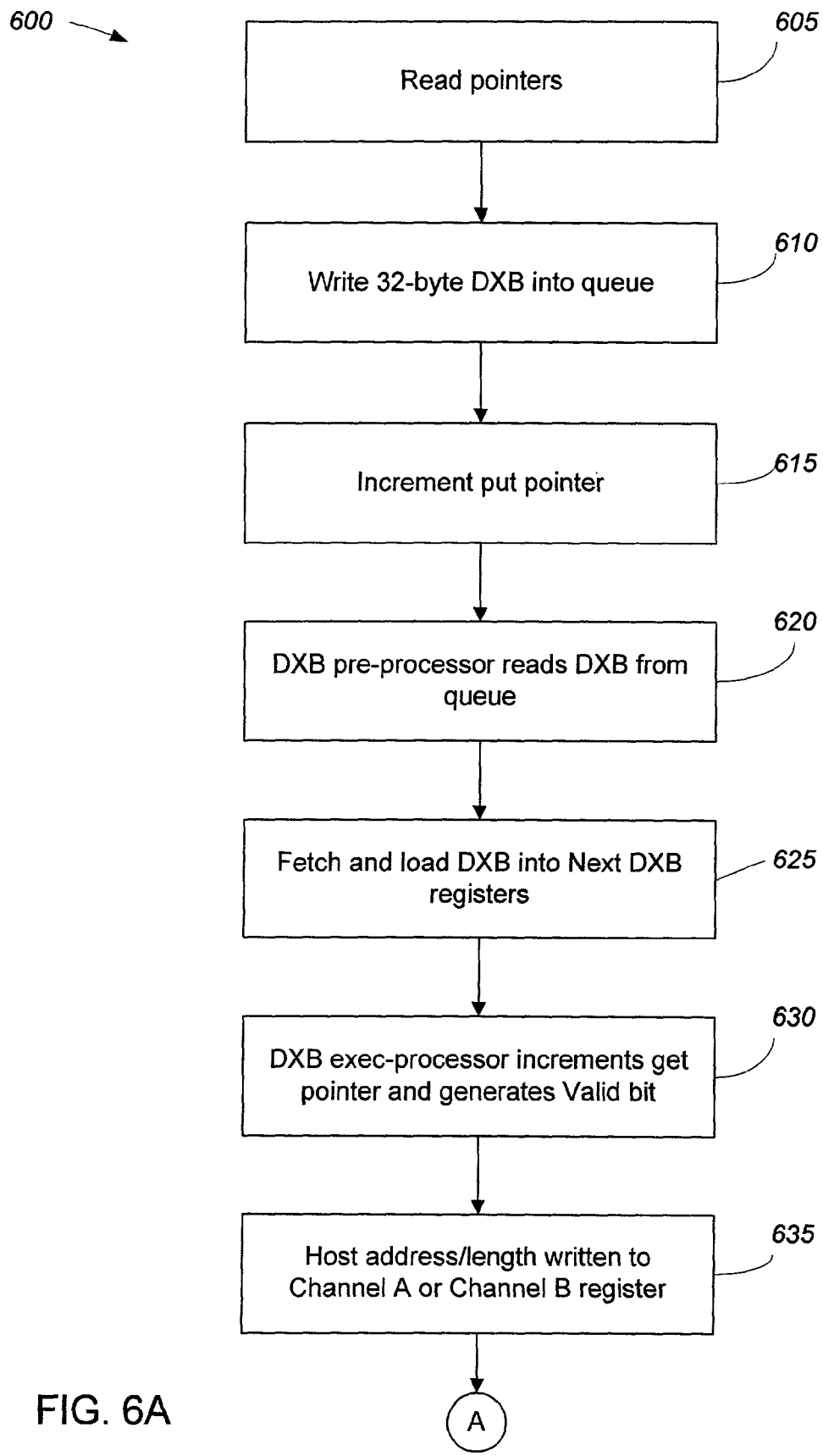
FIGS. 6A–6C are flowcharts describing a DMA operation performed by a transmit DXB processor.
Figure 6B:
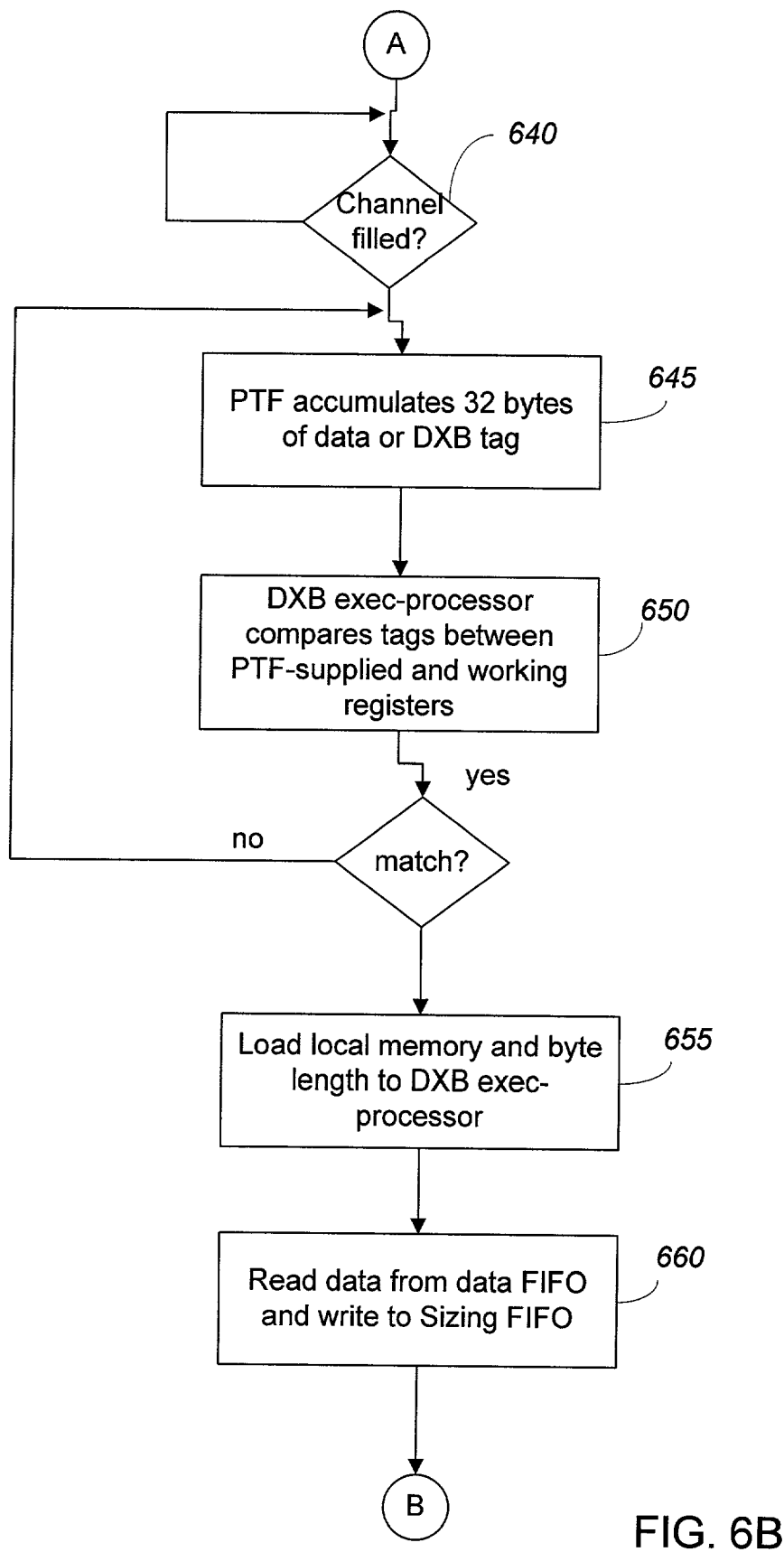
Figure 6C:
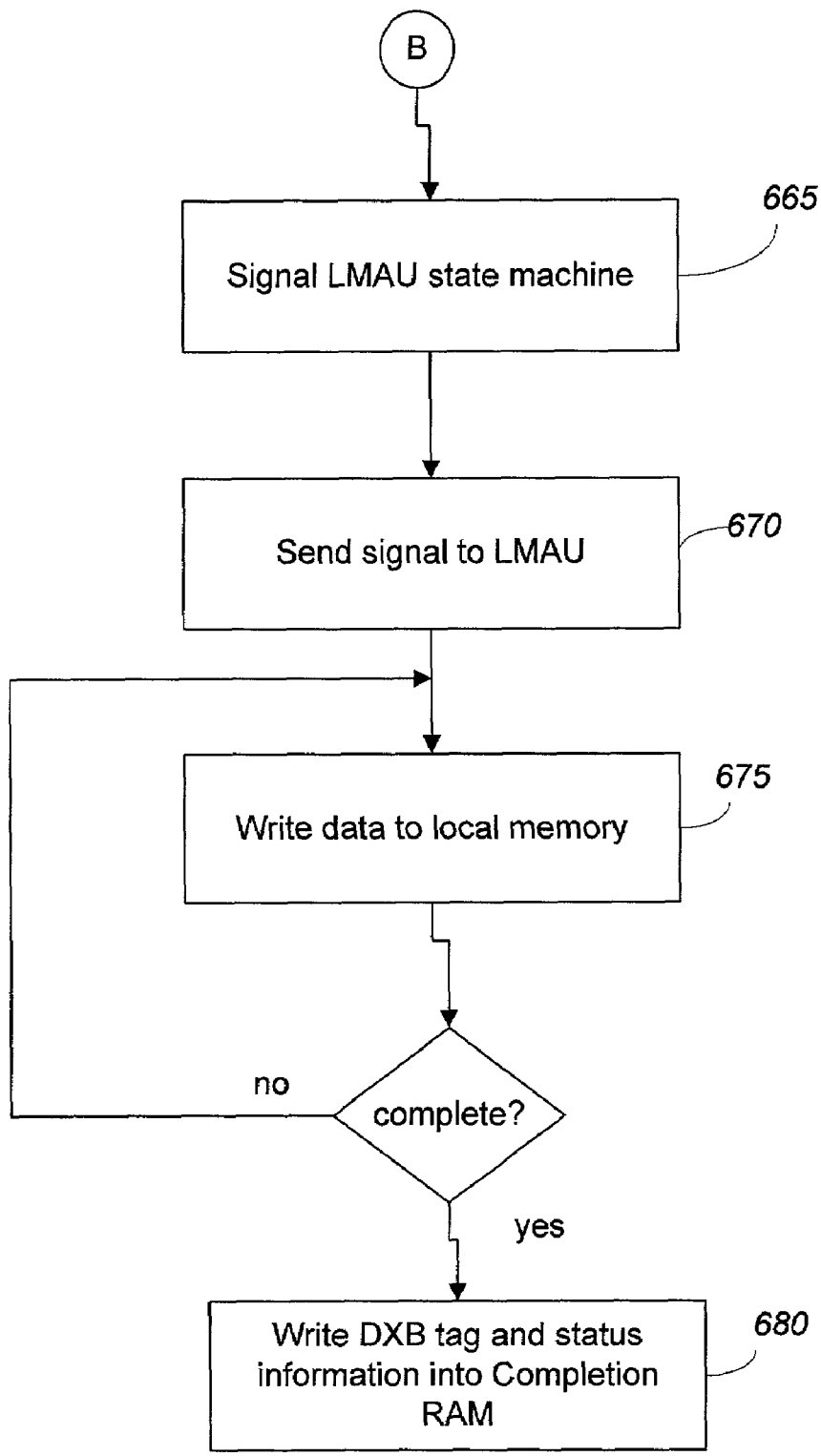
Figure 7:
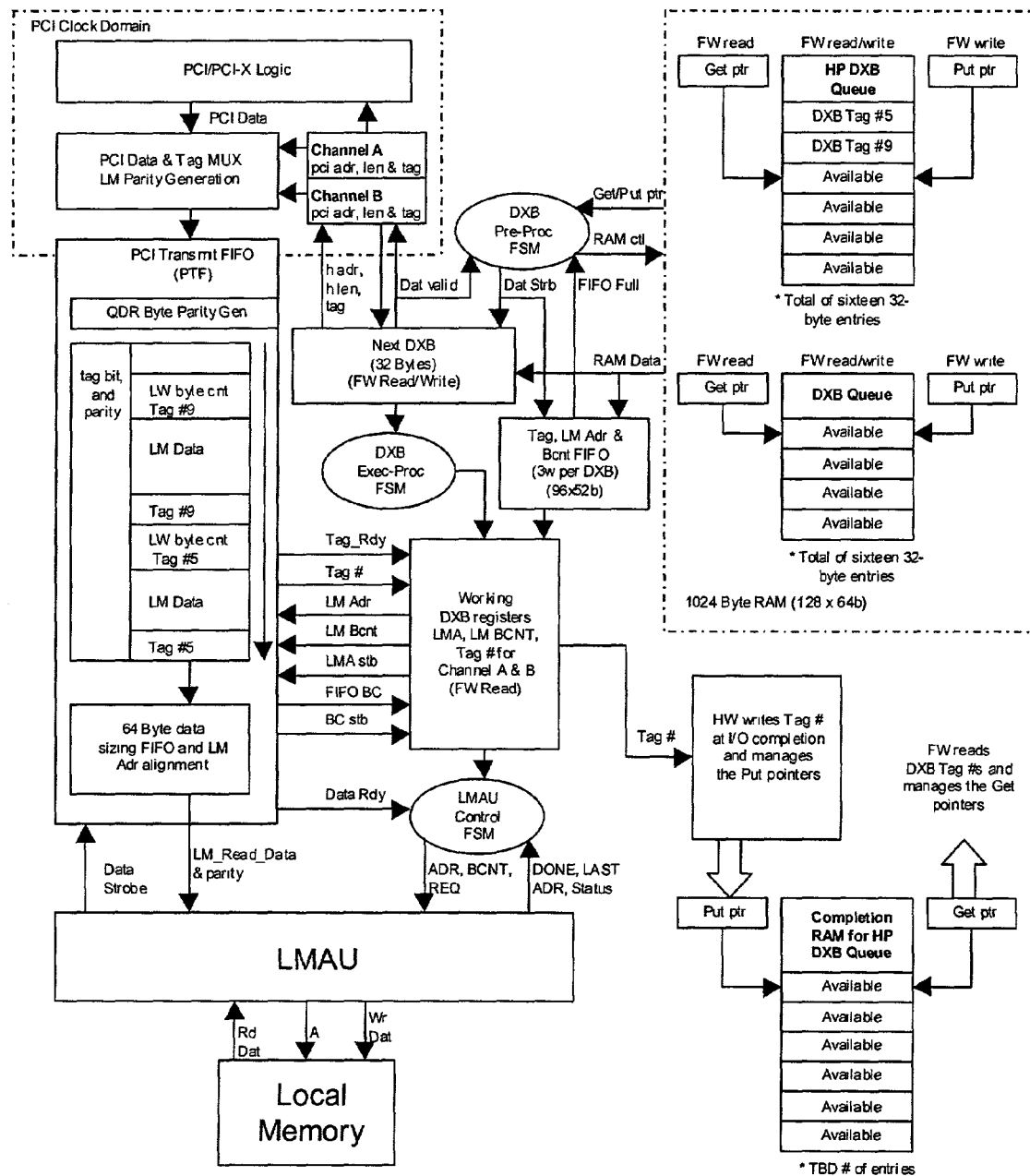
FIG. 7 is a block diagram of a transmit DXB processor.

FIG. 6 is a flowchart describing a DMA operation 600 performed by the transmit DXB processor 700, shown in FIG. 7. PCI/X can support up to thirty-two outstanding transmit operations simultaneously. To support this split operation, the transmit DXB processor may work on two DMA operations simultaneously in two channels, Channel A and Channel B.

To set up a DMA operation, controlling program 130 reads the Put/Get pointer for the desired queue (block 605). If there is space available, a DXB pre-processor 715 performs a 32-byte write operation to either the NP DXB Queue or the HP DXB Queue (block 610). To complete the operation, controlling program 130 must increment the Put pointer to reflect the number of valid DXBs that were written (block 615).

After controlling program 130 updates the Put pointer, the DXB pre-processor state machine determines that Put>Get and will fetch the next DXB in the queue (block 620). The following conditions may need to be met before the next DXB is fetched: a Valid signal is not asserted, which lack of assertion indicates that the Next DXB registers 720 are available; a Local Memory Descriptor (LMD) FIFO 722 is not full; the DXB exec-processor is not in its Error state; and a Channel Control Register's Quiesce bit is not set.

While the DXB pre-processor 715 is reading the 32 byte DXB, the control data is split into two destinations: one for controlling the PCI operation and one for controlling the DMA operation. The Host Address, Length and Tag are written to the Next DXB registers, which will be eventually written to the PCI/X channel registers 702, 704 (block 625). The remaining DXB control data words are first written to a Next DXB register 720, then re-organized and written into the Local Memory Descriptor (LMD) FIFO 722 (block 630).

When the DXB read completes, a DXB exec-processor 725 increments the get pointer and generates a Valid signal which is passed to the PCI/X channel registers (block 630). After the Valid signal is synchronized to the PCI clock domain 760, the Host Address, Length and Tag are written into either the Channel A or B register provided that a channel is vacant and that splits are permitted (block 635).

The DXB pre-processor 715 continues this operation until both Channel A and B control registers are filled (block 640). Then, the DXB pre-processor 715 may load a third DXB into the Next DXB registers 720 and the LMD FIFO 722.

The DXB exec-processor 725 controls the LMD FIFO read operation and monitors when the working registers 765 are ready for another set of local memory descriptors. These descriptors may include the DXB tag and local memory address/byte length for #0, #1 and #2 words. The DXB may include control flags indicating how many extra local memory addresses the DXB contains, i.e., words #1 and #2.

The DXB working registers 765 may include two register sets that contain the DXB tag, and local memory address #0–#2.

Figure 8:
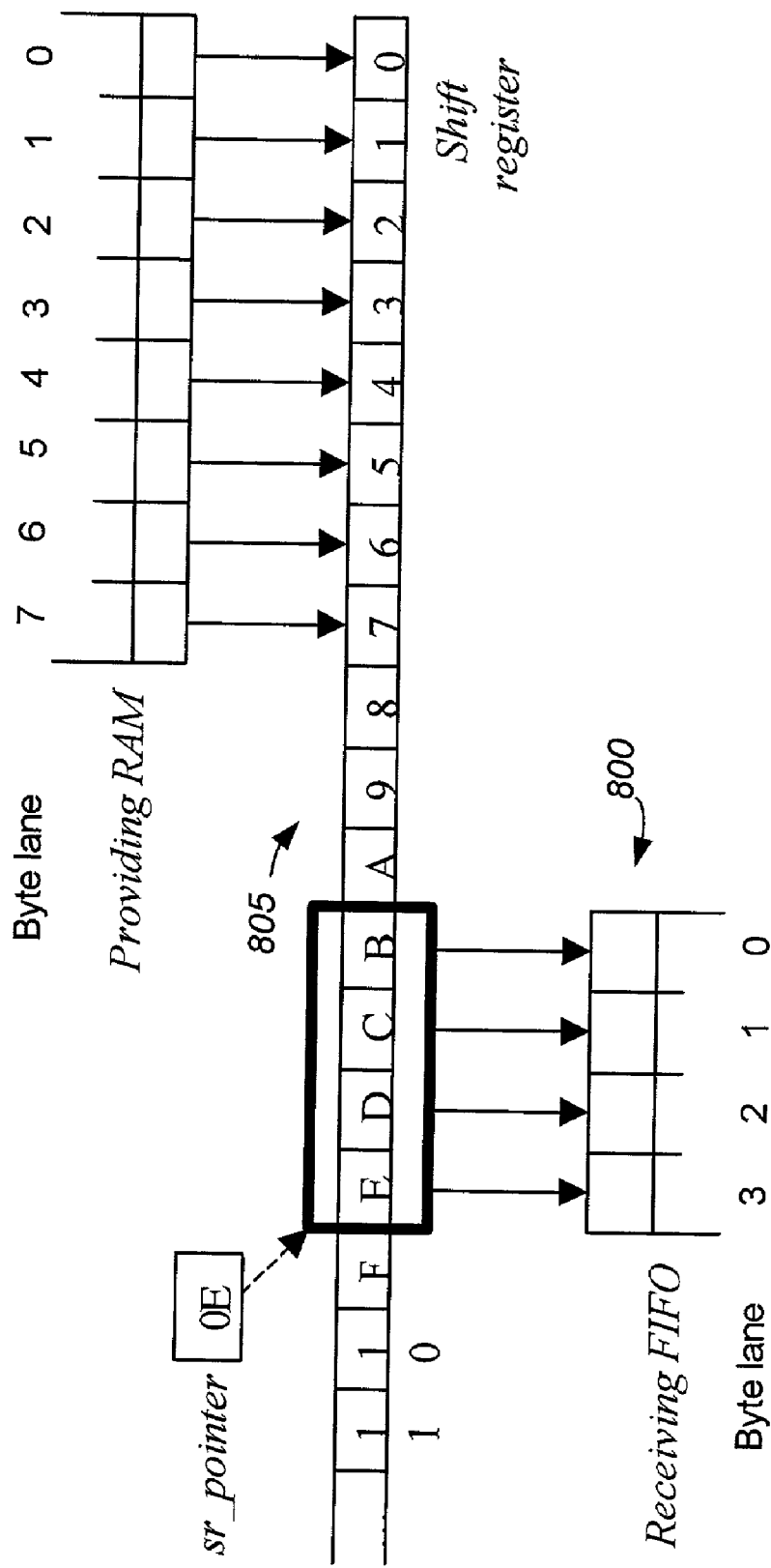
FIG. 8 is a block diagram of a sizing FIFO in a transmit DXB processor.

When a PCI Transmit FIFO (PTF) 730 accumulates at least 32-bytes of data or the DXB Tag has been written into the PTF (block 645), the PTF passes the Tag along with a Tag Ready signal to the DXB exec-processor 725. The DXB exec-processor reads and compares the PTF-supplied tag to the tags that are stored in the two working register sets 765 (block 650). When a match is found, the local memory address and desired byte length is loaded into the DXB exec-processor using an lmau_start signal (block 655). Upon receiving a local memory access strobe, the DXB exec-processor reads the data from a Data FIFO and writes the data into a Sizing FIFO 800, shown in FIG. 8, using the local memory address to byte offset the data and the byte count to write the desired number of bytes (block 660). data shifting logic may use a shift register 805 that is four 64-bit words in width to align data properly for the Sizing FIFO 800. A pointer defines which of the bytes in this register are the next four to be written into the Sizing FIFO. As data is read from the PTF FIFO 730, this data is shifted in, while the oldest 64-bit word is shifted out. The pointer is adjusted according to whether PTF FIFO 730 reads, Sizing FIFO writes 800, or both, or other conditions are occurring on any given clock cycle. When 32 bytes of data are written into the Sizing FIFO 800 (or less, if the FIFO byte count is less than the originally-specified byte count due to split responses or other reasons), the DXB-exec Processor 725 may assert a rd_data_pkt_rdy signal to the LMAU control state machine 775 (block 665).

After data is written to the Sizing FIFO, crossing a threshold (usually 32 bytes), the DXB exec-processor signals this event to the LMAU State Machine 775, which will in turn make the appropriate write request to the LMAU 740. Other conditions which may trigger this event include: the DXB exec-processor 725 detects a Tag Delimiter instead of data; a Last Word Delimiter is detected; or the initial byte count runs to zero.

Protection against writing too much data into local memory 125 may be built into the DXB exec-processor. For the case when the DXB exec-processor's initial request to the LMAU 740 represented a greater byte count than will actually be written in a given local memory request (due to PCI-X bus conditions). This is done by making a second local memory request that presents a byte count to the LMAU 740 that represents the exact number of bytes left in the Sizing FIFO 800.

The LMAU control state machine 775 passes the original local memory address and byte count to the local LMAU 740 when the state machine receives the lmau_start signal (block 670). The LMAU control state machine will handle the control signals to the LMAU while the DXB exec-processor 725 handles the data path (block 675).

As the DXB exec-processor reads the PTF data, the current local memory buffer and byte count are adjusted to reflect the previous read operation, and the state machine is ready to process the next data. If the PTF data word is not a tag, the DXB exec-processor assumes that the PTF data word will be written using the current tag's local memory descriptor. If the PTF data word is a tag, the DXB exec-processor will read the tag and determine how to handle it.

When each DXB completes, that is, when all data has been transferred to local memory 125, the transmit DXB processor 700 writes the DXB tag information along with PCI transfer status into the Completion RAM (block 680).

The DXB pre-processor 715 may also generate a PCI-X tag. The PCI-X tag is made up of two parts, with a field of five bits. This description of how it is generated is valid only if controlling program 130 is not programming the DXB registers directly. In that case, the PCI-X tag is taken directly from the Channel Control Register. For both Channels, the upper two bits (4:3) are taken from the PTB field of the DXB Tx Control Register (DTCTL). For Channel A, bit 2 is fixed at 0, while hardware generates the lower bits (1 through 0) by incrementing a counter by one each time a PCI-X tag is used. For Channel B, bit 2 is fixed at 1, while hardware generates the lower bits (1 through 0) by incrementing a counter by one each time a PCI-X tag is used.

The DXB processors may operate in a Data Mode to account for different data formats. The Data Mode may be triggered by a control flag in the DXB. The Data Mode performs a byte lane swap between the PCI bus and local memory. The PCI bus only operates in little endian, so for the big endian host case there is a byte lane swap between the big endian host memory and the PCI bus. This means that there must be a secondary swap between the PCI bus 115 and local memory 125. For the little endian host, there also must be a byte lane swap between the big endian local memory and the little endian PCI bus.

Figure 9:
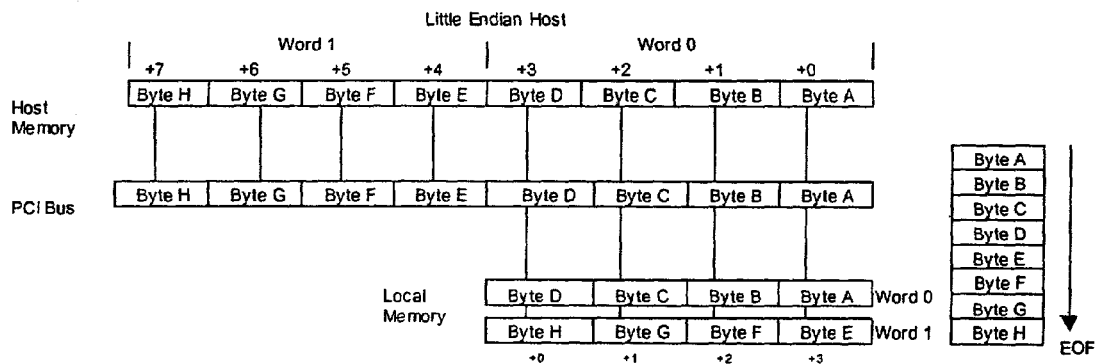
FIG. 9 is a block diagram illustrating the flow of a Little Endian Data Mode operation.

As shown in FIG. 9, the Little Endian Control Mode does not perform a byte lane swap between a PCI bus 900 and local memory 905. Also when working with 64-bit words host memory words, the local memory will interpret host memory bits 31:0 as local memory word 0. The intent for this mode is to transfer control information between local memory 905 and a little endian host 910.

Figure 10:
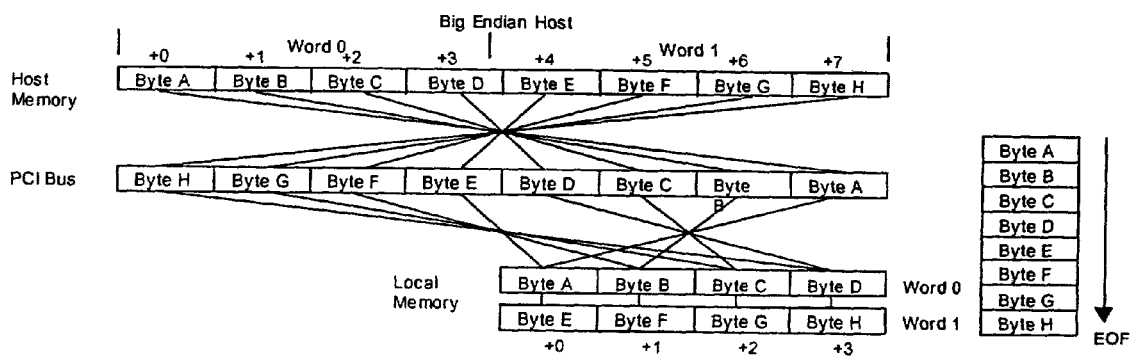
FIG. 10 is a block diagram illustrating the flow of a Big Endian Data Mode operation.

As shown in FIG. 10, the Big Endian Control Mode performs a byte lane swap between a PCI bus 1000 and local memory 1005. The PCI bus only operates in little endian, so there is a byte lane swap between the big endian host memory 1000 and the PCI bus 115. This means that there must be a secondary swap between the PCI bus 1000 and local memory 1005. Also when working with 64-bit host memory words, the local memory will interpret host memory bits 31:0 as local memory word 0. The intent for this mode is to transfer control information between local memory and a big endian host 1010.

The use of the DXB processors may result in fewer CPU cycles being required for defining DMA operations, fewer CPU I/O operations to program the hardware to perform the DMA operation and fewer CPU cycles to post-process the completions of the individual DMA operations. The DXB processors may also achieve more efficient PCI Bus utilization by allowing larger transfers to take place rather than the traditional scenario where the host transfer size matches the frame byte length A number of embodiments have been described. Nevertheless, it will be understood that various modifications may be made without departing from the spirit and scope of the invention. For example, more than three local memory addresses may be mapped to a host address, depending on the size of the DXB and addresses. Also, the transmit DXP processor may include more than two transmit DMA channels. The blocks in the flowcharts may be skipped or performed out of order and still produce desirable results. Accordingly, other embodiments are within the scope of the following claims.

The invention claimed is:

1. A method comprising:
   generating a descriptor within an Input/Output (I/O) device connected to a host through a bus for a single direct memory access operation between the I/O device and the host, said descriptor including memory descriptors and a tag identifying said direct memory access operation;
   writing said descriptor to a queue within the I/O device;
   fetching said descriptor from the queue based on a priority of the descriptor; and
   performing the direct memory access operation to transfer data between a host memory in the host and a local memory within the I/O device;
   wherein the priority of the descriptor is based on a criticality of the direct memory access operation.

2. The method of claim 1, further comprising storing the tag along with status information for the direct memory access operation in response to performing the direct memory access operation.

3. The method of claim 2, wherein the status information indicates that the direct memory access operation completed successfully.

4. The method of claim 2, wherein the status information comprises error information.

5. The method of claim 1, wherein the descriptor has a size corresponding to a cache line.

6. The method of claim 5, wherein said writing the descriptor comprises a cache line spill operation.

7. The method of claim 1, wherein the queue is one of a plurality of queues and said priority comprises a priority of said queue in relation to other queues in said plurality of queues.

8. The method of claim 1, wherein the queue is a first-in first-out (FIFO) buffer, and said priority comprises the descriptors position in the buffer.

9. The method of claim 1, wherein the memory descriptors comprises address and length information for a block of memory.

10. The method of claim 9, further comprising storing in a buffer the tag and address and length information along with data to be written to memory in the direct memory access operation.

11. The method of claim 1, wherein the memory descriptors include a host memory address for a host memory location to be accessed in the direct memory access operation.

12. The method of claim 1, wherein the memory descriptors include a plurality of local memory addresses for a corresponding number of local memory locations to be accessed in the direct memory access operation.

13. The method of claim 12, wherein said plurality of local memory locations are non-contiguous memory locations in a local memory.

14. The method of claim 1, wherein the direct memory access operation is performed over a PCI/X (Peripheral Component Interface Extended) bus.

15. The method of claim 1, wherein the direct memory access operation is performed over the bus, and further comprising:
   converting data in a little endian format received from the bus in the direct memory access operation to a big endian format; and
   storing the data in the big endian format in a local memory.

16. An article comprising a machine-readable medium including machine-executable instructions, the instructions operative to cause a machine to:

generate a descriptor within an Input/Output (I/O) device connected to a host through a bus for a single direct memory access operation between the I/O device and the host, said descriptor including memory descriptors and a tag identifying said direct memory access operation;

write said descriptor to a queue within the I/O device;

fetch said descriptor from the queue based on a priority of the descriptor; and perform the direct memory access operation to transfer data between a host memory in the host and a local memory within the I/O device;

wherein the priority of the descriptor is based on a criticality of the direct memory access operation.

17. The article of claim 16, further comprising instructions operative to cause the machine to store the tag along with status information for the direct memory access operation in response to performing the direct memory access operation.

18. The article of claim 17, wherein the status information indicates that the direct memory access operation completed successfully.

19. The article of claim 17, wherein the status information comprises error information.

20. The method of claim 16, wherein the descriptor has a size corresponding to a cache line.

21. The method of claim 20, wherein the instructions operative to cause the machine to write the descriptor comprise instructions operative to cause the machine to perform a cache line spill operation.

22. The article of claim 16, wherein the queue is one of a plurality of queues and said priority comprises a priority of said queue in relation to other queues in said plurality of queues.

* * * * *